United States Patent [19]
Barr

[11] 3,791,840
[45] Feb. 12, 1974

[54] TREATMENT OF CARBON FIBERS TO IMPROVE SHEAR STRENGTH IN COMPOSITES

[75] Inventor: John Baldwin Barr, Strongsville, Ohio

[73] Assignee: Union Carbide Corporation, New York, N.Y.

[22] Filed: Oct. 21, 1970

[21] Appl. No.: 82,816

[52] U.S. Cl. .............................. 106/307, 423/447
[51] Int. Cl. ............................................ C09c 1/44
[58] Field of Search ...... 106/307; 23/209.1 F, 209.9

[56] References Cited
UNITED STATES PATENTS
3,660,140   5/1972   Scola et al. .................... 23/209.1 F
3,476,703   11/1969  Wadsworth et al. ................ 106/307
3,330,799   7/1967   Voet .................................. 106/307
2,199,936   5/1940   Kauffman ............................. 23/152

OTHER PUBLICATIONS

Miyamichi et al., Chemical Abstracts, Vol. 64, 1966, Col. 12,862 (b)(c).

*Primary Examiner*—James E. Poer
*Attorney, Agent, or Firm*—John S. Piscitello

[57] ABSTRACT

The interlaminar shear strength of carbon fiber-plastic composites is improved by treating the fibers, before they are incorporated into the plastic matrix, with an aqueous solution of hypochlorous acid having a pH below 6.

51 Claims, No Drawings

TREATMENT OF CARBON FIBERS TO IMPROVE SHEAR STRENGTH IN COMPOSITES

BACKGROUND OF THE INVENTION

1. Field of the Invention

This invention relates to improved composite articles comprising a plastic matrix reinforced with carbon fibers.

2. Description of the Prior Art

Composites consisting of a plastic matrix reinforced with carbon fibers are of interest in applications where materials of high strength-and high modulus-to-weight ratios are required, e.g., in aircraft structures, reentry vehicles, space vehicles, and marine deep-submergence pressure vessels. A limitation on the use of such composites, however, is the relatively low bond strength of such fibers to the plastic matrix.

It has been suggested that the strength of the bond between the fibers and the matrix may be improved by treating the fibers to modify their surface by a process such as oxidation. Among the oxidizing agents proposed is sodium hypochlorite [Goan, J.C. and Prosen, S.P., "Interfacial Bonding in Graphite Fiber Resin COmposites," American Society for Testing and Materials, Interfaces in Composites, ASTM, Philadelphia, Pa., 1969, pp 3–26, (ASTM pub. 452)]. However, only modest composite shear strengths have been achieved by such treatment except when very lengthy soaking times are employed, such as 2 or 3 days, or when the treatment is effected in a heated solution. Extended treating periods are undesirable commercially, however, and treatment with heated sodium hypochlorite solutions, even for very limited times, causes serious degradation of the tensile strength of the fibers, rendering them unsuitable for use in preparing composites. The torsional shear strengths of composites prepared from graphite fibers treated with an aqueous solution of sodium hypochlorite under varying conditions of time and temperature are shown in Table I below, together with the Young's modulus and tensile strength of the fibers so treated.

TABLE I

Effect of Sodium Hypochlorite (5.25 wt. %) on Graphite Yarn. Composites Fabricated from Graphite Yarn (50vol.%) and an Epoxy Resin

| Reaction Conditions | | Torsional Shear* Strength, $10^3$psi | Strand Tensile** Strength,$10^3$psi | Modulus,$10^6$psi Young's** |
|---|---|---|---|---|
| Temp. °C | Time, Hours | | | |
| — | 0 | 5.2±0.2 | 252 | 47.5 |
| 30 | 7 | 6.2±0.3 | 231 | 48.8 |
| 30 | 24 | 7.2±0.1 | 226 | 48.3 |
| 30 | 48 | 8.1±0.1 | 228 | — |
| 30 | 65 | 7.8±0.2 | 222 | 47.4 |
| 103 | 0.5 | 8.1±0.2 | 115 | — |
| 103 | 1 | 8.5±0.1 | 121 | — |
| 103 | 2 | 10.1±0.3 | 139 | — |
| 103 | 3 | 10.6±0.1 | 96 | — |
| 103 | 4 | 12.5±0.2 | 129 | — |
| 103 | 7 | 11.9±0.3 | 83 | — |

*Average of 2 samples
**Average of 5 samples

SUMMARY OF THE INVENTION

In accordance with the instant invention it has now been discovered that the interlaminar shear strength of carbon fiber-plastic composites can be materially improved by treating the fibers, before they are incorporated into the plastic matrix, with an aqueous solution of hypochlorous acid having a pH below 6. The improvement in shear strength obtained by such treatment is shown in Table II below, together with the Young's modulus and tensile strength of the graphite fibers treated in this manner.

TABLE II

Effect of Hypochlorous Acid* on Graphite Yarn. Composites Fabricated from Graphite Yarn (50vol.%) and an Epoxy Resin

| Reaction Conditions | | Torsional Shear** Strength, $10^3$psi | Strand Tensile*** Strength, $10^3$psi | Young's*** Modulus,$10^6$psi |
|---|---|---|---|---|
| Temp. °C | Time, hours | | | |
| — | 0 | 5.2±0.2 | 252 | 47.5 |
| 30 | 4 | 6.9±0.1 | 250 | 47.9 |
| 30 | 7 | 8.4±0.1 | 223 | 47.8 |
| 30 | 18 | 9.6±0.3 | 201 | 47.5 |
| 30 | 24 | 10.3±0.5 | 196 | 48.3 |
| 30 | 30 | 10.9±0.1 | 185 | 46.5 |
| 30 | 48 | 12.3±0.2 | 171 | 48.5 |
| 30 | 65 | 12.9±0.6 | 175 | 47.0 |

*Prepared by acidifying a 5.25 wt.% aqueous solution of sodium hypochlorite to a pH of 4 to 5 with chlorine
**Average of 2 samples
***Average of 5 samples As can be seen from a comparison of Tables I and II, significantly higher shear strengths can be obtained by treating the fibers at a given time and temperature with hypochlorous acid solution than can be obtained with sodium hypochlorite solution, or, alternatively, comparable shear strengths can be obtained in much shorter soaking times at a given temperature with hypochlorous acid solution than can be obtained with sodium hypochlorite solution. If still further reductions in soaking times are desired, a soluble chloride salt may be added to the solution to raise the chloride ion concentration. The shear strength and tensile strength values obtained by treating fibers under varying conditions of time and temperature with hypochlorous acid solutions to which a soluble chloride salt has been added is shown in Table III below.

TABLE III

Treatment of Graphite Yarn with Hypochlorous Acid-Sodium Chloride Solution*. Composites Fabricated from Graphite Yarn (50 vol. %) and an Epoxy Resin

| Method of Adjusting pH | Reaction Conditions | | Torsional Shear** Strength, $10^3$psi | Strand Tensile*** Strength, $10^3$psi |
|---|---|---|---|---|
| | Temp.°C. | Time, hours | | |
| — | — | 0 | 5.2±0.2 | 252 |
| HCl | 30 | 1 | 8.1±0.1 | 219 |
| HCl | 30 | 2 | 8.8±0.2 | 208 |
| HCl | 30 | 3 | 9.0±0.1 | 204 |
| Chlorination | 30 | 1 | 8.2±0.2 | 215 |
| Chlorination | 30 | 2 | 8.7±0.1 | 221 |
| Chlorination | 30 | 3 | 9.7±0.3 | 230 |
| Chlorination | 30 | 4 | 9.1±0.1 | 217 |
| Chlorination | 30 | 7 | 10.5±0.2 | 212 |
| Chlorination | 50 | 0.5 | 8.3±0.1 | 211 |
| Chlorination | 50 | 1.0 | 9.1±0.9 | 193 |
| Chlorination | 50 | 2.0 | 9.7±0.6 | 179 |
| Chlorination | 70 | 0.08 | 8.0±0.2 | 223 |
| Chlorination | 70 | 0.17 | 8.7±0.1 | 216 |

TABLE III-Continued

Treatment of Graphite Yarn with Hypochlorous Acid-Sodium Chloride Solution*. Composites Fabricated from Graphite Yarn (50 vol. %) and an Epoxy Resin

| Method of Adjusting pH | Reaction Conditions | | Torsional Shear** Strength, $10^3$psi | Strand Tensile*** Strength, $10^3$psi |
|---|---|---|---|---|
| | Temp.°C. | Time, hours | | |
| Chlorination | 70 | 0.25 | 9.4±0.2 | 188 |
| Chlorination | 70 | 0.5 | 9.7±0.2 | 151 |
| Chlorination | 70 | 1.0 | 10.8±0.3 | 156 |
| Chlorination | 70 | 4 | 8.9±0.1 | 118 |
| Chlorination | 70 | 7 | 9.1±0.3 | 112 |
| Chlorination | 107 | 0.25 | 8.7±0.2 | 180 |
| Chlorination | 107 | 1.0 | 9.8±0.4 | 145 |

*Prepared by adding 200 grams of sodium chloride per liter of a commercially available bleach solution having a pH of about 11 and containing 5.25 wt. % sodium hypochlorite and 4.8 wt. % sodium chloride, and then acidifying the solution with hydrochloric acid or chlorine to a pH of 4 to 5.
**Average of 2 samples
***Average of 5 samples As can be seen from a comparison of Tables II and III, it is possible to obtain comparable shear strength in much shorter soaking times at a given temperature by the addition of a soluble chloride salt to the hypochlorous acid solution, or alternatively, significantly higher shear strengths can be obtained by treating the fibers at a given time and temperature with a hypochlorous acid solution to which a soluble chloride salt has been added than can be obtained from a hypochlorous acid solution to which a soluble chloride salt has not been added. Thus, while several hours soaking is required at room temperature to obtain a composite shear strength in excess of 8 × $10^3$ psi. when a chloride salt has not been added to the solution, a treating time of as little as 1 hour is often sufficient at room temperature to obtain such shear strength when using solutions to which a chloride salt has been added. As can be further seen from Tables II and III, the tensile strength of fibers at such shear strength levels is comparable whether or not sodium chloride has been added to the solution.

In contrast to the result obtained when a soluble chloride salt is added to a hypochlorous acid solution, it is not possible to shorten the soaking time necessary to obtain comparable shear strength by adding a soluble chloride salt to a solution of sodium hypochlorite unless high treating temperatures are employed. This is demonstrated by a comparison of Table I above with Table IV below.

TABLE IV

Treatment of Graphite Yarn with Sodium Hypochlorite-Sodium Chloride Solution*. Composites Fabricated from Graphite Yarn (50 vol. %) and an Epoxy Resin

| Reaction Conditions | | Torsional Shear** Strength, $10^3$ psi | Strand Tensile Strength, $10^3$psi*** |
|---|---|---|---|
| Temp. °C. | Time, Hours | | |
| — | 0 | 5.2±0.1 | 252 |
| 30 | 7 | 5.9±0.1 | 216 |
| 30 | 24 | 7.2±0.1 | 198 |
| 30 | 48 | 7.3±0.1 | 210 |
| 30 | 65 | 7.1±0.1 | 213 |
| 107 | 0.5 | 7.8±0.1 | 192 |
| 107 | 1 | 9.6±0.1 | 189 |

TABLE IV-Continued

Treatment of Graphite Yarn with Sodium Hypochlorite-Sodium Chloride Solution*. Composites Fabricated from Graphite Yarn (50 vol. %) and an Epoxy Resin

| Reaction Conditions | | Torsional Shear** Strength, $10^3$ psi | Strand Tensile Strength, $10^3$psi*** |
|---|---|---|---|
| Temp. °C. | Time, Hours | | |
| 107 | 2 | 11.3±0.1 | 102 |
| 107 | 3 | 13.9±0.1 | 135 |

*Prepared by adding 200 grams of sodium chloride per liter of a commercially available bleach solution having a pH of about 11 and containing 5.25 wt. % sodium hypochlorite and 4.8 wt. % sodium chloride
**Average of 2 samples
***Average of 5 samples

DESCRIPTION OF THE PREFERRED EMBODIMENTS

Because of the unstable nature of hypochlorous acid, the aqueous solution employed to treat the carbon fibers is prepared immediately prior to use, preferably by acidifying a water solution of a soluble hypochlorite salt, such as sodium hypochlorite, potassium hypochlorite, lithium hypochlorite, calcium hypochlorite, and the like, to a pH value of 6 or less, preferably to between 4 to 5. In the case of more stable hypochlorite salts, such as calcium hypochlorite, the solution can be conveniently prepared by dissolving the solid hypochlorite salt in water. In the case of hypochlorite salts which are unstable in their solid state, such as sodium hypochlorite, it is necessary to prepare the aqueous solution by chemical reaction in water. By way of illustration, an aqueous solution of sodium hypochlorite can be produced by the reaction of chlorine with a water solution of sodium hydroxide according to the equation:

$$2NaOH + Cl_2 \longrightarrow NaOCl + NaCl + H_2O$$

After the water solution of the hypochlorite salt has been prepared, it is converted to hypochlorous acid by acidifying the solution to a pH value of 6 or less, preferably to between 4 to 5. Acidification of the solution is preferably effected by the addition of hydrochloric acid or chlorine, but any acidifying agent which will cause a lowering of the pH to the desired value can be employed. The hypochlorite salt should be present in the solution in an amount which would provide the stoichiometric amount of hypochlorite ion necessary to produce a hypochlorous acid concentration of 0.34 moles per liter if the reaction caused by the acidification proceeded to completion and the hypochlorite ion were fully converted to hypochlorous acid. Preferably, the water-soluble salt is employed in an amount which would provide an excess of hypochlorite ion of at least 2 times, most preferably from 3 to 5 times, above that necessary to produce a hypochlorous acid concentration of 0.34 moles per liter if the reaction caused by the acidification proceeded to completion. The reaction by which sodium hypochlorite is converted to hypochlorous acid by chlorine and hydrochloric acid can be illustrated by the equations:

$$NaOCl + Cl_2O \rightleftharpoons NaCl + 2HOCl$$
$$NaOCl + HCl \xrightarrow{aqueous} NaCl + HOCl$$

The conversion of calcium hypochlorite to hypochlorous acid can be illustrated by the equation:

$$Ca(OCl)_2 + 2HCl \xrightarrow{aqueous} CaCl_2 + 2HClO$$

Suitable hypochlorous acid solutions can be prepared according to the invention by adding hydrochloric acid or chlorine to a solution containing at least 1.2 grams, preferably from 2 grams to 6 grams, of sodium hypochlorite per 100 grams of water until the desired pH is obtained. When calcium hypochlorite is employed, at least 4.8 grams of the calcium hypochlorite salt is dissolved per 100 grams of water before the addition of hydrochloric acid or chlorine to the solution to adjust the pH.

If a water soluble chloride salt is added to the solution to reduce the soaking time required, it should be added in an amount which together with other chloride ions present (e.g., from the hydrochloric acid or chlorine added to acidify the solution or the chloride produced by adding chlorine to convert sodium hydroxide to sodium hypochlorite) is sufficient to raise the total chloride ion concentration to a level of at least 1.5 gram-atoms per liter, preferably from 3.2 gram-atoms per liter to 4.7 gram-atoms per liter. Suitable water-soluble chloride salts which can be employed include sodium chloride, potassium chloride, lithium chloride, calcium chloride, and the like. Because the chloride salt accelerates the decomposition of hypochlorous acid, the soluble chloride salt should be added to the solution before it is acidified. As long as the solution remains basic it is stable and can be stored for long periods of time, but once it is acidified to convert the hypochlorite to hypochlorous acid, the solution becomes unstable and must be used immediately.

After the hypochlorous acid solution has been prepared, the carbon fibers are immersed therein and allowed to soak until a fiber which will give the desired composite shear strength has been obtained. For convenience, the fibers may be wrapped around a spool or similar object before being immersed in the acid solution. The duration of the soaking period depends upon how great a composite shear strength is desired, as well as upon tensile strength requirements and the temperature of the hypochlorous acid bath. While the composite shear strength increases with increased soaking times, the tensile strength of the fibers is degraded as soaking continues. For this reason, prolonged soaking periods are undesirable and should be limited to prevent excessive degradation of the tensile strength of the fibers. Likewise, while heating serves to accelerate the increase in shear strength, it also causes more rapid degradation of the tensile strength of the fibers, so that excessive heating is also undesirable.

In order to form useful carbon fiber-plastic matrix composites a minimum shear strength of $8 \times 10^3$ psi. together with a minimum fiber tensile strength of $2 \times 10^5$ psi. is generally required. To obtain such shear strengths, it is usually necessary to soak the fibers in the hypochlorous acid solution for a period of about 7 hours at 30° C., or about 5 hours at 50° C. or 3 hours at 70° C. When a soluble chloride salt is added to the solution, soaking times of about 3 hours are usually required at 30° C., while about 30 minutes are required at 50° C., and about 10 minutes are necessary at 70° C. In order for the fiber to also have the desired tensile strength, the temperature and/or soaking time should be limited and the starting fibers employed should have a sufficiently high tensile strength so that they are not degraded below $2 \times 10^5$ psi. by the hypochlorous acid solution under the conditions employed. In the case of carbon fibers having a tensile strength before treatment of about 250,000 psi., the desired final tensile strength can be obtained, in the case when a soluble chloride salt has been added to the solution, by limiting soaking to about 7 hours at 30° C., or 30 minutes at 50° C., or 10 minutes at 70° C. Preferably, the hypochlorous acid bath is maintained at from about 20° C. to 30° C. whether or not a soluble chloride salt is added to the solution. However, equally good results can be obtained at higher temperatures by limiting the soaking time.

After the carbon fiber has been immersed in the hypochlorous acid bath for a satisfactory length of time, it is removed from the bath, washed with water and dried. The fiber may then be compounded with a plastic matrix in accordance with known techniques.

High modulus high strength carbon fibers suitable for use in the instant invention can be prepared as described in U.S. Pat. Nos. 3,503,708 and 3,412,062.

Any thermosetting resin binder which is compatible with carbon or graphite yarn can be employed as the matrix in producing the carbon fiber-resin composites of the present invention. Suitable resins include, by way of illustration, phenolic resins, epoxy resins, Friedel-Crafts resins, and the like.

Carbon fiber-resin composites are usually fabricated by coating the fibers with a suitable resin binder and, subsequently, curing the resin binder after the article to be constructed has been formed to shape to produce a rigid fiber-resin composite or structure.

The following example is set forth for purposes of illustration so that those skilled in the art may better understand this invention, and it should be understood that it is not to be construed as limiting this invention in any manner. The term "carbon" as used throughout this specification includes all forms of the material, both graphitic and non-graphitic.

EXAMPLE I

Samples from nine different lots of two-ply graphite yarn were separately wrapped on nine Pyrex glass spools 3.5 inches high and 12 inches in circumference. The yarn contained 720 filaments per ply with the filaments characterized by an average Young's modulus of 50,000,000 psi. and an average tensile strength of 288,000 psi. The spools were designed to allow free access of a treating bath to the graphite fiber when submerged in the bath.

The spools were placed in glass vessels which were filled with hypochlorous acid solution to a level which covered the spools when they were placed in the solution, and the vessels were covered. The hypochlorous acid solution was prepared by acidifying a commercially available bleach solution having a pH of about 11 and containing 5.25 wt.-% sodium hypochlorite and 4.8 wt.-% sodium chloride to a pH of 4 to 5 by slowly bubbling chlorine through the solution. The chlorine was introduced into the reaction vessel through a glass tube submerged in the solution, allowed to bubble slowly through the solution, and then conducted into a concentrated sodium carbonate bath to remove unreacted chlorine. For convenience, the flow of chlorine was usually continued for the duration of the experiment. The bath was continuously stirred with a Teflon coated bar and a magnetic stirrer. After soaking for 7 hours at room temperature, the spools were removed from the bath, washed for about 1 hour in flowing distilled water, and dried by heating for 1 hour at a temperature of 180° C.

The procedure was then repeated twice employing a bath prepared by adding 200 grams of sodium chloride per liter of a commercially available bleach solution having a pH of about 11 and containing 5.25 wt.-% sodium hypochlorite and 4.8 wt.-% sodium chloride, and then acidifying the solution to a pH of 4 to 5 with chlorine in the manner described above. In both instances nine samples of graphite yarn were employed as above and the treating conditions were the same except that in the first instance the spools were soaked for 3 hours instead of 7, and in the second instance they were soaked for 0.25 hours and the bath was maintained at 70° C. instead of room temperature.

The yarns prepared in this manner were tested for tensile strength and fabricated into unidirectional composites with an epoxy resin (ERL 2256, a commercially available liquid epoxy resin, was employed together with 19 pph metaphenylene diamine as a hardening agent). The composites contained 50 volume percent fibers. The amount of fibers required to produce such composites was predetermined from the cross-sectional area of the fibers and the volume of the mold employed. The correct amount of fiber was wound on a plastic spool having a circumference of about 7 inches and then impregnated under vacuum at room temperature with the epoxy resin containing the hardener. The impregnated yarn was then cut from the spool and placed unidirectionally in a steel mold. The yarn length was trimmed to the size of the mold and the ends of the mold were sealed with Teflon strips. Pressure was then applied evenly and the resin was cured by heating at 80° C. for 3 hours and then at 160° C. for 2 hours. The cured composite was then removed from the mold and machine ground to a cylinder 5 inches long and 0.150 inches in diameter. The shear strength of the composite was determined by the torsional method as described by Adams, D.F., and Thomas, R.L., "The Solid-Rod Torsion Test for the Determination of Unidirectional Composite Shear Properties," Textile Research Journal, 339–345 (April, 1969).

The tensile strength of the fibers and the torsional shear strength of the composites are set forth in Table V below.

0.34 moles per liter if the hypochlorite radical were fully converted to hypochlorous acid.

2. A process as in claim 1 wherein the hypochlorous acid solution has a pH of from 4 to 5.

3. A process as in claim 2 wherein the hypochlorous acid solution has a temperature of from 20° C. to 30° C.

4. A process in claim 1 wherein the hypochlorous acid solution contains an excess of hypochlorite radical of at least 2 times that necessary to produce a hypochlorous acid concentration of 0.34 moles per liter if the hypochlorite radical were fully converted to hypochlorous acid.

5. A process as in claim 4 wherein the hypochlorous acid solution contains an excess of hypochlorite radical of from 3 to 5 times that necessary to produce a hypochlorous acid concentration of 0.34 moles per liter if the hypochlorite radical were fully converted to hypochlorous acid.

6. A process as in claim 4 wherein the hypochlorous acid solution has a pH of from 4 to 5.

7. A process as in claim 5 wherein the hypochlorous acid solution has a pH of from 4 to 5.

8. A process as in claim 6 wherein the hypochlorous acid solution has a temperature of from 20° C. to 30° C.

9. A process as in claim 7 wherein the hypochlorous acid solution has a temperature of from 20° C. to 30° C.

10. A process as in claim 4 wherein the hypochlorous acid solution also contains a chloride ion concentration of at least 1.5 gram-atoms per liter.

11. A process as in claim 10 wherein the hypochlorous acid solution has a pH of from 4 to 5.

12. A process as in claim 11 wherein the hypochlorous acid solution has a temperature of from 20° C. to 30° C.

13. A process as in claim 5 wherein the hypochlorous acid solution contains a chloride ion concentration of

TABLE V

Treatment of Graphite Yarn in Hypochlorous Acid and Hypochlorous Acid-Sodium Chloride Solutions. Composites Fabricated from Graphite Yarn (50 vol. %) and an Epoxy Resin

| Sample | Torsional Shear Strength, $10^3$ psi | | | | Strand Tensile Strength, $10^3$ psi | | | |
|---|---|---|---|---|---|---|---|---|
| | As Rec'd | No.1 | No.2 | No.3 | As Rec'd | No.1 | No.2 | No.3 |
| 1 | 5.9 | 7.6 | 8.8 | 9.7 | 262 | 242 | 210 | 195 |
| 2 | 5.3 | 10.1 | 9.7 | 9.4 | 247 | 212 | 216 | 187 |
| 3 | 5.3 | 11.7 | 8.8 | 9.7 | 277 | 244 | 292 | 261 |
| 4 | 4.9 | 6.9 | 6.8 | 8.1 | 302 | 264 | 289 | 303 |
| 5 | 4.4 | 9.1 | 7.9 | 6.1 | 278 | 268 | 270 | 256 |
| 6 | 5.6 | 7.3 | 8.0 | 8.7 | 314 | 289 | 309 | 316 |
| 7 | 4.3 | 8.1 | 8.2 | 7.4 | 297 | 285 | 351 | 296 |
| 8 | 4.5 | 6.6 | 8.3 | 11.3 | 326 | 268 | 269 | 325 |
| 9 | 4.4 | 6.8 | 5.8 | 6.5 | 292 | 276 | 321 | 295 |
| avg. | 5.0 | 8.2 | 8.0 | 8.5 | 288 | 261 | 281 | 270 |

No. 1 – Treated at room temperature for 7 hours in a solution prepared by acidifying a commercially available bleach solution having a pH of about 11 and containing 5.25 wt. % sodium hypochlorite and 4.8 wt. % sodium chloride to a pH of 4 to 5.
No. 2 – Treated at room temperature for 3 hours in a solution prepared by adding 200 grams of sodium chloride per liter of a commercially available bleach solution having a pH of about 11 and containing 5.25 wt. % sodium hypochlorite and 4.8 wt. % sodium chloride, and then acidifying the solution to a pH of 4 to 5.
No. 3 – Treated at 70°C for 15 minutes in a solution prepared in accordance with No. 2.

What is claimed is:

1. A process of treating high modulus high density carbon fiber to improve the bonding characteristics of said fiber to a plastic matrix comprising soaking the fiber in an aqueous solution of hypochlorous acid having a pH below 6, said solution containing at least the stoichiometric amount of hypochlorite radical necessary to produce a hypochlorous acid concentration of from 3.2 gram-atoms per liter to 4.7 gram-atoms per liter.

14. A process as in claim 13 wherein the hypochlorous acid solution has a pH of from 4 to 5.

15. A process as in claim 14 wherein the solution has a temperature of from 20° C. to 30° C.

16. A process of treating high modulus high density carbon fiber to improve the bonding characteristics of said fiber to a plastic matrix comprising (1) preparing a water solution of a soluble hypochlorite salt, (2) acidifying the solution to a pH below 6, and (3) soaking the fiber in the acidified solution, said hypochlorite salt being present in said solution in an amount which would provide at least the stoichiometric amount of hypochlorite ion necessary to produce a hypochlorous acid concentration of 0.34 moles per liter if the reaction caused by the acidification proceeded to completion and the hypochlorite ion were fully converted to hypochlorous acid.

17. A process as in claim 16 wherein the hypochlorous acid solution has a pH of from 4 to 5.

18. A process as in claim 17 wherein the hypochlorous acid solution has a temperature of from 20° C. to 30° C.

19. A process as in claim 16 wherein the hypochlorite salt is present in the solution in an amount which would provide an excess of hypochlorite ion of at least 2 times that necessary to produce a hypochlorous acid concentration of 0.34 moles per liter if the reaction caused by the acidification proceeded to completion.

20. A process as in claim 19 wherein the hypochlorite salt is present in the solution in an amount which would provide an excess of hypochlorite ion of from 3 to 5 times that necessary to produce a hypochlorous acid concentration of 0.34 moles per liter if the reaction caused by the acidification proceeded to completion.

21. A process as in claim 19 wherein the hypochlorous acid solution has a pH of from 4 to 5.

22. A process as in claim 20 wherein the hypochlorous acid solution has a pH of from 4 to 5.

23. A process as in claim 21 wherein the hypochlorous acid solution has a temperature of from 20° C. to 30° C.

24. A process as in claim 22 wherein the hypochlorous acid solution has a temperature of from 20° C to 30° C.

25. A process as in claim 16 wherein the soluble hypochlorite salt is sodium hypochlorite and the acidifying agent is selected from the group consisting of chlorine and hydrochloric acid.

26. A process as in claim 17 wherein the soluble hypochlorite salt is sodium hypochlorite and the acidifying agent is selected from the group consisting of chlorine and hydrochloric acid.

27. A process as in claim 18 wherein the soluble hypochlorite salt is sodium hypochlorite and the acidifying agent is selected from the group consisting of chlorine and hydrochloric acid.

28. A process as in claim 19 wherein the soluble hypochlorite salt is sodium hypochlorite and the acidifying agent is selected from the group consisting of chlorine and hydrochloric acid.

29. A process as in claim 20 wherein the soluble hypochlorite salt is sodium hypochlorite and the acidifying agent is selected from the group consisting of chlorine and hydrochloric acid.

30. A process as in claim 21 wherein the soluble hypochlorite salt is sodium hypochlorite and the acidifying agent is selected from the group consisting of chlorine and hydrochloric acid.

31. A process as in claim 22 wherein the soluble hypochlorite salt is sodium hypochlorite and the acidifying agent is selected from the group consisting of chlorine and hydrochloric acid.

32. A process as in claim 23 wherein the soluble hypochlorite salt is sodium hypochlorite and the acidifying agent is selected from the group consisting of chlorine and hydrochloric acid.

33. A process as in claim 24 wherein the soluble hypochlorite salt is sodium hypochlorite and the acidifying agent is selected from the group consisting of chlorine and hydrochloric acid.

34. A process as in claim 16 wherein the water solution of soluble hypochloric salt also contains a soluble chloride salt and said soluble chloride salt is present in said solution in an amount which together with the other chloride ions present is sufficient to raise the total chloride ion concentration of the solution to a level of at least 1.5 gram-atoms per liter.

35. A process as in claim 34 wherein the hypochlorous acid solution has a pH of from 4 to 5.

36. A process as in claim 35 wherein the hypochlorous acid solution has a temperature of from 20° C. to 30° C.

37. A process as in claim 34 wherein the hypochlorite salt is present in the solution in an amount which would provide an excess of hypochlorite ion of at least 2 times that necessary to produce a hypochlorous acid concentration of 0.34 moles per liter if the reaction caused by the acidification proceeded to completion.

38. A process as in claim 37 wherein the hypochlorite salt is present in the solution in an amount which would provide an excess of hypochlorite ion of from 3 to 5 times that necessary to produce a hypochlorous acid concentration of 0.34 moles per liter if the reaction caused by the acidification proceeded to completion, and the chloride salt is present in said solution in an amount which together with other chloride ions present is sufficient to raise the total chloride ion concentration of the solution to a level of from 3.2 gram-atoms per liter to 4.7 gram-atoms per liter.

39. A process as in claim 37 wherein the hypochlorous acid solution has a pH of from 4 to 5.

40. A process as in claim 38 wherein the hypochlorous acid solution has a pH of from 4 to 5.

41. A process as in claim 39 wherein the hypochlorous acid solution has a temperature of from 20° C. to 30° C.

42. A process as in claim 40 wherein the hypochlorous acid solution has a temperature of from 20° C. to 30° C.

43. A process as in claim 34 wherein the soluble hypochlorite salt is sodium hypochlorite, the soluble chloride salt is sodium chloride, and the acidifying agent is selected from the group consisting of chlorine and hydrochloric acid.

44. A process as in claim 35 wherein the soluble hypochlorite salt is sodium hypochlorite, the soluble chloride salt is sodium chloride, and the acidifying agent is selected from the group consisting of chlorine and hydrochloric acid.

45. A process as in claim 36 wherein the soluble hypochlorite salt is sodium hypochlorite, the soluble chloride salt is sodium chloride, and the acidifying agent is selected from the group consisting of chlorine and hydrochloric acid.

46. A process as in claim 37 wherein the soluble hypochlorite salt is sodium hypochlorite, the soluble chloride salt is sodium chloride, and the acidifying agent is selected from the group consisting of chlorine and hydrochloric acid.

47. A process as in claim 38 wherein the soluble hypochlorite salt is sodium hypochlorite, the soluble chloride salt is sodium chloride, and the acidifying agent is selected from the group consisting of chlorine and hydrochloric acid.

48. A process as in claim 39 wherein the soluble hypochlorite salt is sodium hypochlorite, the soluble chloride salt is sodium chloride, and the acidifying agent is selected from the group consisting of chlorine and hydrochloric acid.

49. A process as in claim 40 wherein the soluble hypochlorite salt is sodium hypochlorite, the soluble chloride salt is sodium chloride, and the acidifying agent is selected from the group consisting of chlorine and hydrochloric acid.

50. A process as in claim 41 wherein the soluble hypochlorite salt is sodium hypochlorite, the soluble chloride salt is sodium chloride, and the acidifying agent is selected from the group consisting of chlorine and hydrochloric acid.

51. A process as in claim 42 wherein the soluble hypochlorite salt is sodium hypochlorite, the soluble chloride salt is sodium chloride, and the acidifying agent is selected from the group consisting of chlorine and hydrochloric acid.

* * * * *